(No Model.) 3 Sheets—Sheet 1.
G. H. FURBISH.
COMBINED CIRCULAR SAW AND LATHE TO BE OPERATED BY FOOT POWER.
No. 511,331. Patented Dec. 26, 1893.

Witnesses:
Walter E. Lombard
Herbert E. Lombard

Inventor:
George H. Furbish,
by N. C. Lombard Attorney.

THE NATIONAL LITHOGRAPHING COMPANY,
WASHINGTON, D. C.

(No Model.) 3 Sheets—Sheet 2.

G. H. FURBISH.
COMBINED CIRCULAR SAW AND LATHE TO BE OPERATED BY FOOT POWER.

No. 511,331. Patented Dec. 26, 1893.

Witnesses:
Walter E. Lombard
Herbert E. Lombard

Inventor:
George H. Furbish,
by N. C. Lombard
Attorney.

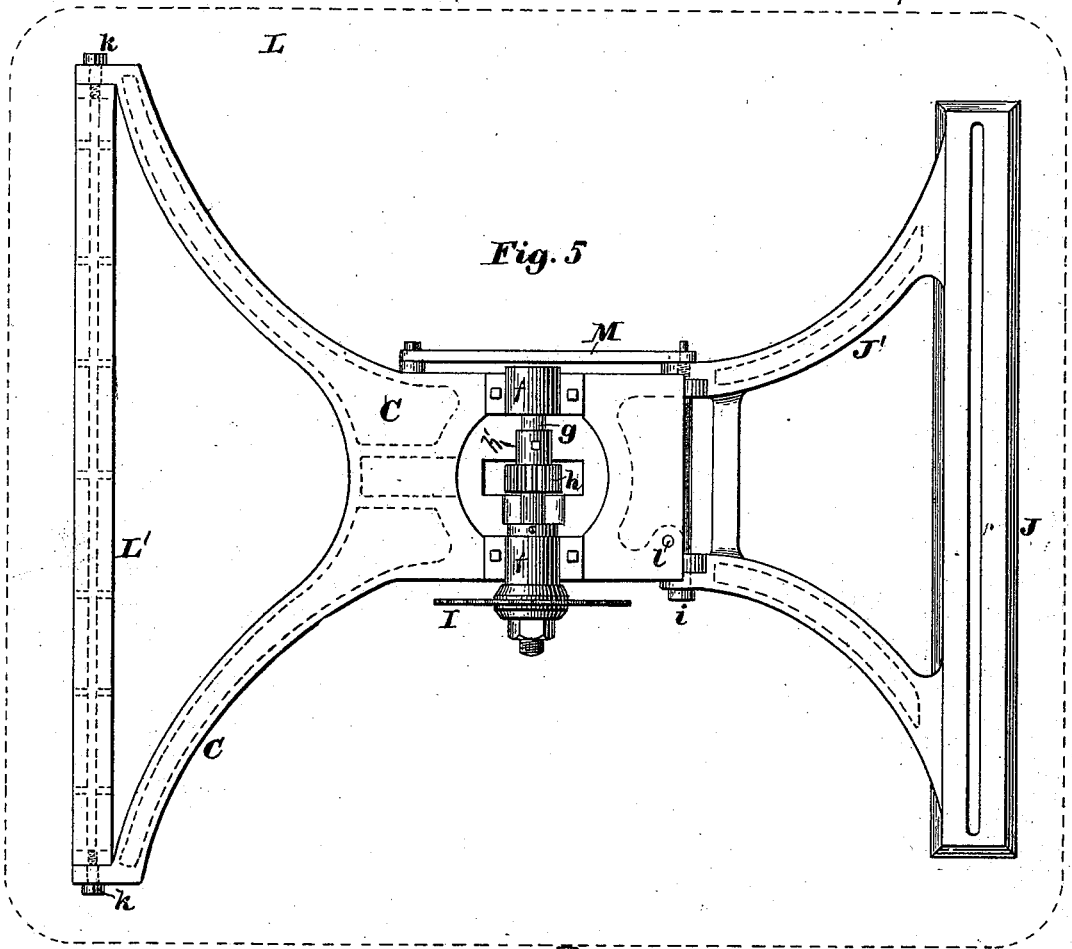

UNITED STATES PATENT OFFICE.

GEORGE H. FURBISH, OF CAMBRIDGE, MASSACHUSETTS.

COMBINED CIRCULAR SAW AND LATHE TO BE OPERATED BY FOOT-POWER.

SPECIFICATION forming part of Letters Patent No. 511,331, dated December 26, 1893.

Application filed February 25, 1893. Serial No. 463,678. (No model.)

*To all whom it may concern:*

Be it known that I, GEORGE H. FURBISH, of Cambridge, in the county of Middlesex and State of Massachusetts, have invented certain new and useful Improvements in a Combined Circular Saw and Lathe to be Operated by Foot-Power, of which the following, taken in connection with the accompanying drawings, is a specification.

My invention relates to combined circular saws and lathes mounted upon the same frame, to be operated by foot power, and it consists in certain novel features of construction, arrangement and combination of parts, which will be readily understood by reference to the description of the accompanying drawings, and to the claims hereinafter contained, in which my invention is clearly pointed out.

Figure 1:
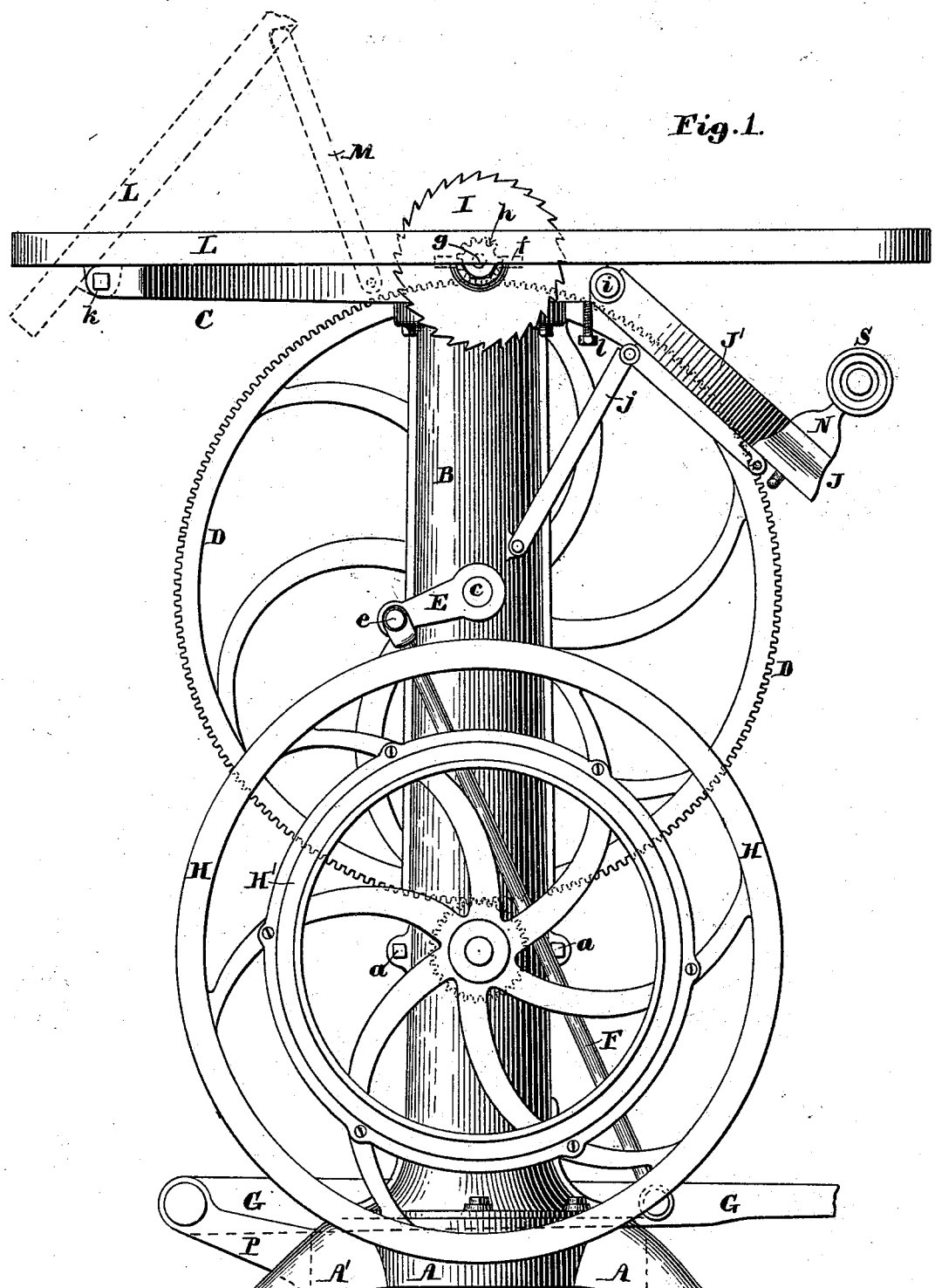
Figure 3:
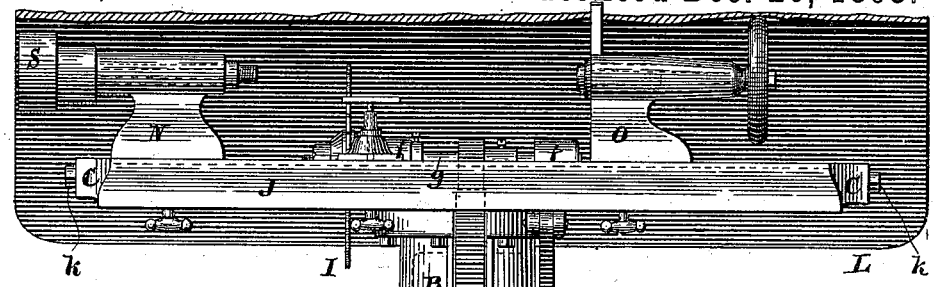
Figure 3:
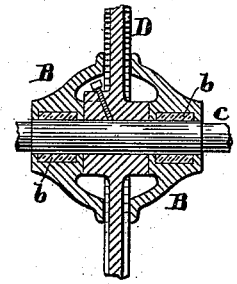
Figure 4:
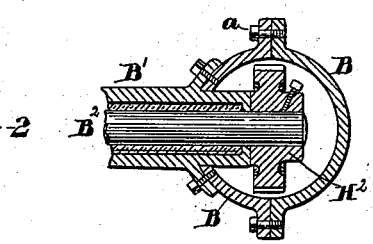
Figure 2:
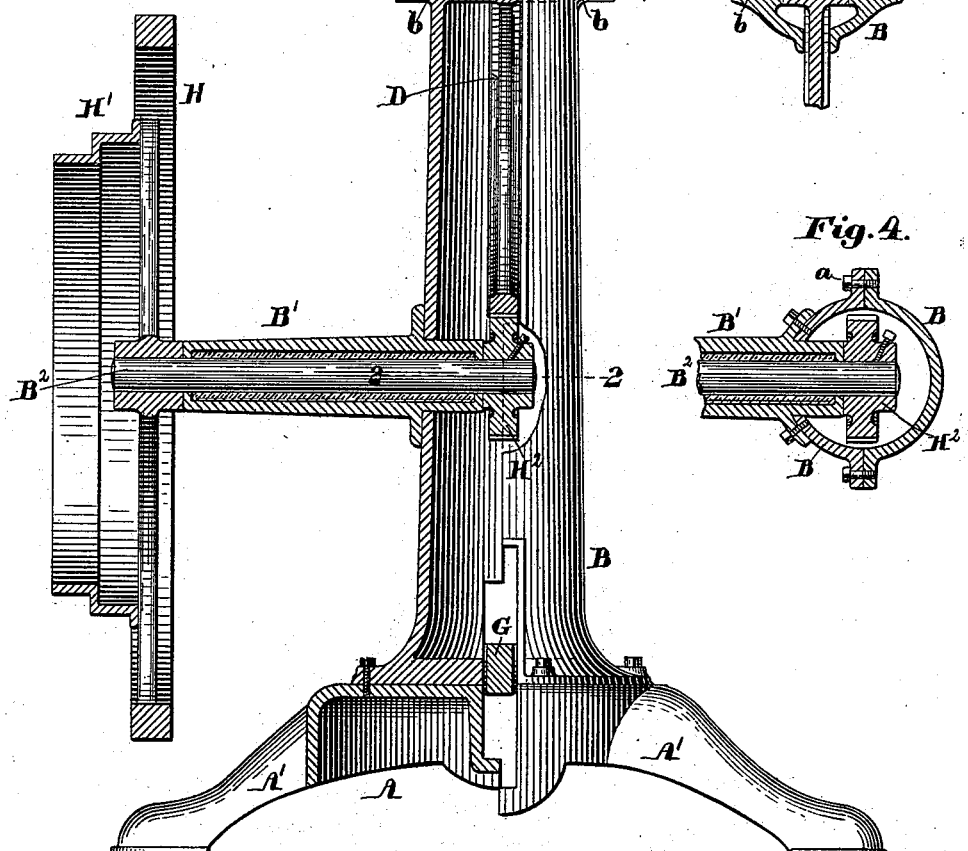

Figure 1 of the drawings is a side elevation of a machine embodying my invention, with the parts in position for using the saw, the lathe bed being dropped out of its operative position, and a portion of the operating treadle being broken away. Fig. 2 is a sectional elevation of the same with the lathe bed in its operative position and the saw table raised and partly broken away. Fig. 3 is a horizontal section on line 1, 1, on Fig. 2. Fig. 4 is a similar section on line 2, 2, on Fig. 2. Fig. 5 is a plan of the lathe bed and the saw-table supporting frame, with the saw and saw arbor mounted thereon, shown in full lines, and showing the outline of the saw table in dotted lines. Fig. 6 is a plan of the treadle complete. Fig. 7 is a partial sectional elevation of the same the cutting plane being on line 3, 3, on Fig. 6. Fig. 8 is a transverse section on line 4, 4, on Fig. 6. Fig. 9 is an inverted plan of a portion of said treadle with the foot pad portion adjusted to a different position, and Fig. 10 is a plan of the movable end of the treadle lever with the foot pad plate removed.

In the drawings A is a base provided with four legs A' cast integral therewith and having firmly bolted thereto the column B made in two halves divided longitudinally and secured together by being bolted to the base A at its lower end, and to the frame C at its upper end, and by the bolts $a$ $a$, as shown in Figs. 1, and 4.

The column B has formed therein the bearings $b$ $b$, one in each half, in which is mounted the shaft $c$ having firmly secured thereon the spur gear wheel D arranged to revolve between the two halves of said column, and the two cranks E E, provided with crank pins $e$ $e$, upon which are mounted the upper ends of the two connecting rods F. F., the lower ends of which are pivoted to the bosses $d$ $d$ on opposite sides of the treadle lever G, as shown in Fig. 6.

One of the halves of the column B has secured thereto, or formed in one piece therewith, the laterally projecting pipe-box B', in which is mounted the shaft B², having firmly secured upon its outer end the fly wheel H, carrying the cone-pulley H', and upon its inner end the pinion H², the teeth of which are engaged by the teeth of the gear wheel D, as shown in Figs. 1 and 2.

The frame C has formed therein bearings $f.f.$, in which is mounted the arbor $g$, upon one end of which is secured in the usual manner the circular saw I, and between said bearings the pinion $h$ and collar $h'$ are secured on said arbor, so that said pinion and arbor will revolve together when said pinion is in engagement with the teeth of the gear D, and said gear is revolved, and said pinion may, by loosening the set-screw on said collar, be moved endwise with said arbor to disengage it from said gear D when it is desired to use the lathe, thereby preventing the possibility of accident from contact with the saw in motion.

J is the lathe bed of usual construction, except that it is provided with the rearwardly projecting frame J' which is pivoted at $i$ to the frame C as shown in Figs. 1 and 5.

The bed J is held in its raised position, when desired for use, by the toggle like brace $j$, connected at one end to the under side of said bed, and at its other end to the column, and jointed at or near the middle of its length, as shown in Figs. 1 and 2. When not required for use said bed is dropped into the inclined position shown in Fig. 1, in which position it is supported by the toggle links as shown in Fig. 1.

L is the saw table, made preferably of wood, and having secured to its under side near its rear end the metal bar L', which is pivoted by the screw pivots $k$ $k$ to the rear ends of the curved arms of the frame C, so that said table may be raised to the position indicated by dotted lines in Fig. 1, when the lathe bed is raised into its working position, said table being held in said raised position by the strut M the movable end of which enters a recess, formed in the under side of said table for that purpose, said strut M assuming a horizontal position beneath the table, with its free end resting on the pin connecting the bed J to the frame C, as shown in Fig. 5.

N is the head-stock and O the tail-stock of the lathe, of any usual construction, secured to the bed J in a well known manner. The saw table may be raised to a slightly inclined position, to gage the depth of the saw cut, by means of the screw $l$, set in the frame C, as shown in Fig. 1.

The treadle lever G pivoted at its rear end to brackets or ears P projecting from the base A, as shown in Fig. 1, has formed thereon the oppositely projecting bosses $d\ d$, and has formed on its front end the spider-like expansion G', in the center of which is fitted the pivot pin $m$ provided with the thumb nut $n$, the head of said pin or bolt $m$ being fitted to and movable in a T shaped groove $o$ formed in the under side of the elongated foot pad plate R, and extending lengthwise thereof, as shown in Figs. 7, 8 and 9.

The expanded front end G' of the treadle lever is provided on its upper surface with an annular rim or bearing surface upon which is formed a series of upwardly projecting teeth $n'\ n'$ which fit into the slot or groove $o$ in said pad, to register it in the desired position, whether in line with, or at an angle of forty-five degrees or ninety degrees to the treadle lever G. The pad plate R is adjustable on said treadle lever to any desired angle as above described, and endwise thereon so as to increase the length or width of the treadle lever according to the kind of work being done, as for instance, if it is desired to saw a piece of lumber of say ten feet in length, the operator would have to stand farther away from the saw, in order to balance the piece of lumber, and to do so and be able to operate the saw through the treadle lever the plate R would be adjusted toward the right of Fig. 6 to a greater or less extent, and in using the lathe it will sometimes happen that the operator will have to stand so much to one side of the treadle lever that the plate R will need to be arranged as shown in Fig. 9.

S is a cone pulley mounted upon and secured to the spindle of the head-stock of the lathe, to which rotary motion is imparted by a suitable belt (not shown) leading from said cone-pulley to and around the cone-pulley H'.

The operation of my invention is as follows: When it is desired to use the saw, the lathe bed is dropped into the position shown in Fig. 1, and the operator revolves the saw by working the treadle. If it is desired to use the lathe the saw table is raised into the inclined position shown in dotted lines in Fig. 1, the saw, arbor and pinion $h$ are moved endwise in the bearings $f$ to disengage said pinion from the gear wheel D, the lathe bed is raised into the position shown in Fig. 2 and a belt is placed upon the cone pulleys when the lathe may be operated by working the treadle while the saw remains stationary. This construction makes a very useful tool combining a circular saw and lathe that may be used alternately and occupying no more space than a saw alone would.

I claim—

1. The combination of a base A; a column made in two halves bolted together and to said base; a cap frame secured to the top of said column; a saw arbor mounted upon said frame; a treadle lever pivoted to said base; mechanism connecting said treadle and saw arbor and mounted upon said column; a saw table pivoted to the rear of said cap frame and adapted to be arranged in a horizontal or an inclined position; a lathe bed pivoted to the front of said cap frame and adapted to be held in a horizontal or inclined position; a head-stock and tail-stock mounted upon said bed and mechanism having provision for imparting motion to the spindle of said head-stock when said lathe is raised to its horizontal position.

2. In a foot-power operated circular saw the combination of the column B made in two halves with a slot or space between their upper portions; a cap frame secured to the upper end of said column; a saw arbor mounted in bearings in said cap frame; a pinion secured upon said arbor between said bearings; a saw table hinged to said cap frame; the shaft $c$ mounted in bearings in the two halves of said column; the gear wheel D mounted on said shaft between the two halves of said column; the shaft $B^2$; pinion $H^2$; the fly wheel H; the cranks E $e$, E $e$, connecting rods F, F, and treadle lever G, all constructed arranged and operating substantially as described.

3. In a combined lathe and circular saw, the combination of a supporting column carrying the driving mechanism for operating said lathe and saw; the cap frame C secured to the top of said column; the saw table L pivoted to the rear of said frame; the strut M for holding said table in its raised position; the lathe bed J and frame J' pivoted to the front of said cap frame C; and the toggle brace $j$ constructed and arranged to support said lathe in working position when straightened and in its dropped or inclined position when partially folded.

In testimony whereof I have signed my name to this specification, in the presence of two subscribing witnesses, on this 21st day of February, A. D. 1893.

GEORGE H. FURBISH.

Witnesses:
N. C. LOMBARD,
WALTER E. LOMBARD.